United States Patent
Hayes et al.

(10) Patent No.: US 6,692,556 B2
(45) Date of Patent: Feb. 17, 2004

(54) DESICCANT CARTRIDGE WITH ELONGATED CENTER TUBE

(75) Inventors: Lisa Mae Hayes, Farmington Hills, MI (US); Gregory Alan Fast, Garden Grove, CA (US); Robert Willard Pasma, Alta Loma, CA (US); Glenn D. Perrine, Eaton, OH (US); John M. Evans, Piqua, OH (US)

(73) Assignees: Stanhope Products Co., Brookville, OH (US); Calsonickansei North America, Inc., Farmington Hills, MI (US)

( * ) Notice: Subject to any disclaimer, the term of this patent is extended or adjusted under 35 U.S.C. 154(b) by 17 days.

(21) Appl. No.: 10/056,174

(22) Filed: Jan. 24, 2002

(65) Prior Publication Data

US 2003/0079610 A1 May 1, 2003

Related U.S. Application Data

(60) Provisional application No. 60/350,480, filed on Oct. 29, 2001.

(51) Int. Cl.[7] .............................................. B01D 53/04
(52) U.S. Cl. ........................... 96/147; 96/151; 210/282; 210/DIG. 6; 55/518; 62/474
(58) Field of Search ................... 62/474, 509; 206/204; 210/282, 288, DIG. 6; 96/108, 147, 151; 55/512, 515, 516, 518, 510

(56) References Cited

U.S. PATENT DOCUMENTS

| | | |
|---|---|---|
| 3,545,227 A | 12/1970 | Grahl |
| 4,436,623 A | 3/1984 | Cullen et al. |
| 4,457,843 A | 7/1984 | Cullen et al. |
| 4,474,035 A | 10/1984 | Amin et al. |
| 4,808,201 A * | 2/1989 | Kertzman ....................... 96/10 |
| 5,038,582 A | 8/1991 | Takamatsu |
| 5,123,660 A * | 6/1992 | Dahlheimer et al. ......... 277/393 |
| 5,177,982 A * | 1/1993 | Plemens ....................... 62/503 |
| 5,435,153 A * | 7/1995 | Hutchison et al. ............ 62/474 |
| 5,522,204 A * | 6/1996 | Wood ........................... 53/452 |
| 5,529,203 A | 6/1996 | Flaugher |
| 5,540,348 A | 7/1996 | Wood |
| 5,569,316 A | 10/1996 | Flaugher et al. |
| 5,580,451 A * | 12/1996 | Tack ............................ 210/266 |
| 5,596,882 A * | 1/1997 | Hutchison et al. ............ 62/503 |
| 5,685,087 A | 11/1997 | Flaugher et al. |
| 5,716,432 A | 2/1998 | Perrine |
| 5,718,743 A * | 2/1998 | Donnelly et al. .............. 96/135 |
| 5,814,136 A | 9/1998 | Wood |
| 5,865,998 A | 2/1999 | Abraham et al. |
| 5,910,165 A | 6/1999 | Haramoto et al. |
| 6,309,450 B1 * | 10/2001 | Millen et al. .................. 96/131 |
| 6,337,015 B1 * | 1/2002 | Poirier ......................... 210/232 |
| 6,389,843 B2 * | 5/2002 | McAllister et al. ........... 62/509 |
| 6,449,978 B2 * | 9/2002 | Sugisaki et al. .............. 62/474 |

FOREIGN PATENT DOCUMENTS

| | | |
|---|---|---|
| JP | 10-267473 A * | 10/1998 |
| WO | WO 01/24911 A1 * | 4/2001 |
| WO | WO 01/94864 A1 * | 12/2001 |

* cited by examiner

*Primary Examiner*—Frank M. Lawrence
(74) *Attorney, Agent, or Firm*—Wegman Hessler & Vanderburg (57) ABSTRACT

This invention relates generally to desiccant cartridges for use in R/Ds or accumulators canisters of automotive air conditioning systems. More specifically, this invention relates to a desiccant cartridge including a cup having inner and outer walls coaxially disposed wherein the inner wall defines an elongated center tube having opposing first and second ends. The first end of the center tube communicating with the outlet port in an R/D or accumulator canister to eliminate the fluid flow tube used therein.

15 Claims, 9 Drawing Sheets

DESICCANT CARTRIDGE WITH ELONGATED CENTER TUBE

CROSS-REFERENCE TO RELATED APPLICATIONS

The benefit of prior U.S. Provisional Application No. 60/350,480 filed Oct. 29, 2001 is hereby claimed.

FIELD OF THE INVENTION

This invention relates generally to desiccant cartridges for use in receiver/dryers or accumulator canisters of automotive air conditioning systems. More specifically, it relates to a desiccant cartridge including a cup having an elongated center tube for replacing the fluid flow tube in a receiver/dryer or accumulator canister.

BACKGROUND OF THE INVENTION

Desiccant cartridges containing desiccant particles are common in automotive air conditioning systems for dehydrating refrigerants. These desiccant cartridges are adapted to fit within receiver/dryer and accumulator canisters or assemblies.

Receiver/Dryer (R/D) and accumulator assemblies are used in automotive air conditioning assemblies to separate liquid refrigerant from gaseous refrigerant and to pass only the liquid downstream in the system. In many of these assemblies, a fluid flow tube is integrally formed with the top wall of the R/D or accumulator assembly and is commonly composed of metal such as stainless steel or aluminum.

Desiccant containing cartridges such as those shown in U.S. Pat. Nos. 5,814,136; 5,716,432; 5,685,087; 5,569,316; 5,540,348; 5,529,203; and 5,522,204 are disposed in the R/D and accumulator assemblies and function to dry the liquid refrigerant as it passes from the assembly inlet through the fluid flow tube to an outlet port contained in the structure. Typically, these cartridges contain a centrally disposed sleeve member that is adapted for snug reception over the fluid flow tube of the R/D or accumulator assembly so as to position the cartridge inside the assembly housing.

Some of the drawbacks to these R/D or accumulator metal fluid flow tubes are that they necessitate extra material, manufacturing, handling and assembly costs. Also, metal tubes can introduce contaminates into the air conditioning system in the form of metal chips and debris. As such, elimination of the metal tube could realize a significant cost savings and eliminate the risk of contamination.

Accordingly, there is a need in the art for the provision of a more economical structure which uses, as the fluid flow tube, a material that is less expensive than metal. An even more specific need is presented for the provision of a fluid flow tube that is integral with the desiccant containing cartridge.

Notably, the desiccant cartridge of the present invention is designed to eliminate the costly metal center tube by replacing it with a desiccant cartridge having a cup with an inner wall that defines an elongated center tube having first and second ends wherein the first end of the center tube communicates with the outlet port in the top wall of the R/D or accumulator assembly. The first end is formed from a plastic material, preferably a high temperature resistant plastic, to withstand the heat when the top wall of the R/D or accumulator assembly is welded to the canister-like housing. Also, it can be advantageous to use plastics, such as a plastic collar, having certain heat shrinkage properties so that the collar shrinks around the first end of the center tube and outlet port to form a better seal therebetween after the top wall of the canister is welded thereto.

In another aspect of the invention, the first end may be shaped to receive a high temperature o-ring, tubular insert, or ferrule, may be positioned within the first end of the center tube and outlet port to fill and seal the outlet port from the top wall of the R/D or accumulator and the center tube thereby further protecting and insulating the first end from heat during welding of the top wall of the R/D or accumulator onto the canister.

Accordingly, the center tube design of the desiccant cartridge provides a simple way for replacing a metal fluid flow tube while at the same time reducing the material, manufacturing, handling and assembly costs associated therewith.

Additionally, the plastic center tube of the desiccant cartridge further eliminates the metal chips and debris associated with metal tubes which can harm air conditioning systems.

SUMMARY OF THE INVENTION

The present invention provides a desiccant cartridge of the type including a cup having spaced inner and outer walls coaxially disposed wherein the inner wall defines an elongated center tube having first and second ends, and the outer wall has an upper and lower edge. The cup further includes a transverse portion having a top and bottom surface such that the transverse portion is connected to the outer and inner wall to define a chamber having an opening with the bottom surface of the transverse portion facing away from the chamber.

A plurality of desiccant particles is contained within the chamber for dehydrating air and refrigerants, and a cap having a planar portion with an inner circumference defining an aperture for slidably receiving the tube is securely received within the opening of the chamber to keep the desiccant particles contained therein.

In one embodiment, the cup has an elongated center tube with opposing first and second ends wherein the first end extends above the upper edge of the outer wall and the second end extends away from the bottom surface of the transverse portion. The cup is a one-piece plastic molding, preferably formed from polypropylene, by conventional molding techniques.

In another embodiment, the first end is formed from a high temperature resistant plastic, such as a polypropylene/nylon blend. In this embodiment, the first end is molded separately from the cup then press fit to the inner wall opposite the second end to form a center tube having a first end comprising a high temperature resistant plastic.

Accordingly, the desiccant cartridge of the present invention is designed to be used in combination with an R/D or accumulator canister including an outer wall axially disposed. The canister further has a bottom wall cooperating with the outer wall to define a chamber having an opening. The canister further is provided with a top wall having an outlet port therein, preferably centrally located. During assembly the top wall is secured, preferably by welding, to the canister opposite the bottom wall to seal the chamber.

Prior to placing and welding the top wall onto the canister to complete assembly of the R/D or accumulator, an assembled desiccant cartridge is placed within the chamber so that the second end of the tube communicates with a mounting flange that is spaced above the bottom wall of the receiver dryer to support the cartridge. When the top wall is placed onto the canister, the center tube aligns with the outlet port such that the first end of the tube is in communication therewith.

In either embodiment above, the first end may be shaped to receive a temperature resistant o-ring to further protect and insulate the first end from heat during welding of the top wall onto the canister.

Further, with respect to the center tube, and more specifically, the first end of the tube, it can be advantageous to use plastics, such as a plastic collar, around the first end of the tube which have heat shrinkage properties so that after heating of the tube during welding, shrinkage occurs during cooling so as to form a better seal between the center tube and the outlet port.

In yet another embodiment, the first end of the tube cooperates with a tubular insert to be able to communicate with the outlet port. In this embodiment, after the desiccant cartridge is placed into the R/D or accumulator canister and the top wall placed and secured thereon, the ferrule is inserted through the outlet port so that the insert sealingly engages with the first end of the tube and sealingly engages with the outlet port to fill an air gap therebetween allowing the center tube to communicate with the outlet port.

Accordingly, the elongated center tube configuration of the desiccant cartridge effectively eliminates the need for fluid flow tubes in R/Ds and accumulators. Instead, this fluid flow tube may be formed as a part of the desiccant cartridge itself.

Therefore, it may be appreciated that an object of the present invention is to provide a desiccant cartridge designed to eliminate the metal center tube used in R/D and accumulators while at the same time reducing the material, manufacturing, handling and assembly costs associated therewith.

It is a further object of present invention to provide a desiccant cartridge with an elongated center tube formed from plastic to eliminate the chips and metal debris associated with metal tubes which can harm air conditioning systems.

It is another object of the invention to provide a center tube having a first end comprising a high temperature plastic to withstand the heat from welding the top wall of the canister thereon.

Other objects and advantages of the invention will be apparent from the following description and the accompanying drawings.

DETAILED DESCRIPTION OF THE PREFERRED EMBODIMENT

FIGS. 1–9 show the present invention which concerns a desiccant cartridge 10 including a cup 12 having an elongated center tube 14 for replacing the fluid flow tube (not shown) in an R/D or accumulator canister 16.

Figure 1:
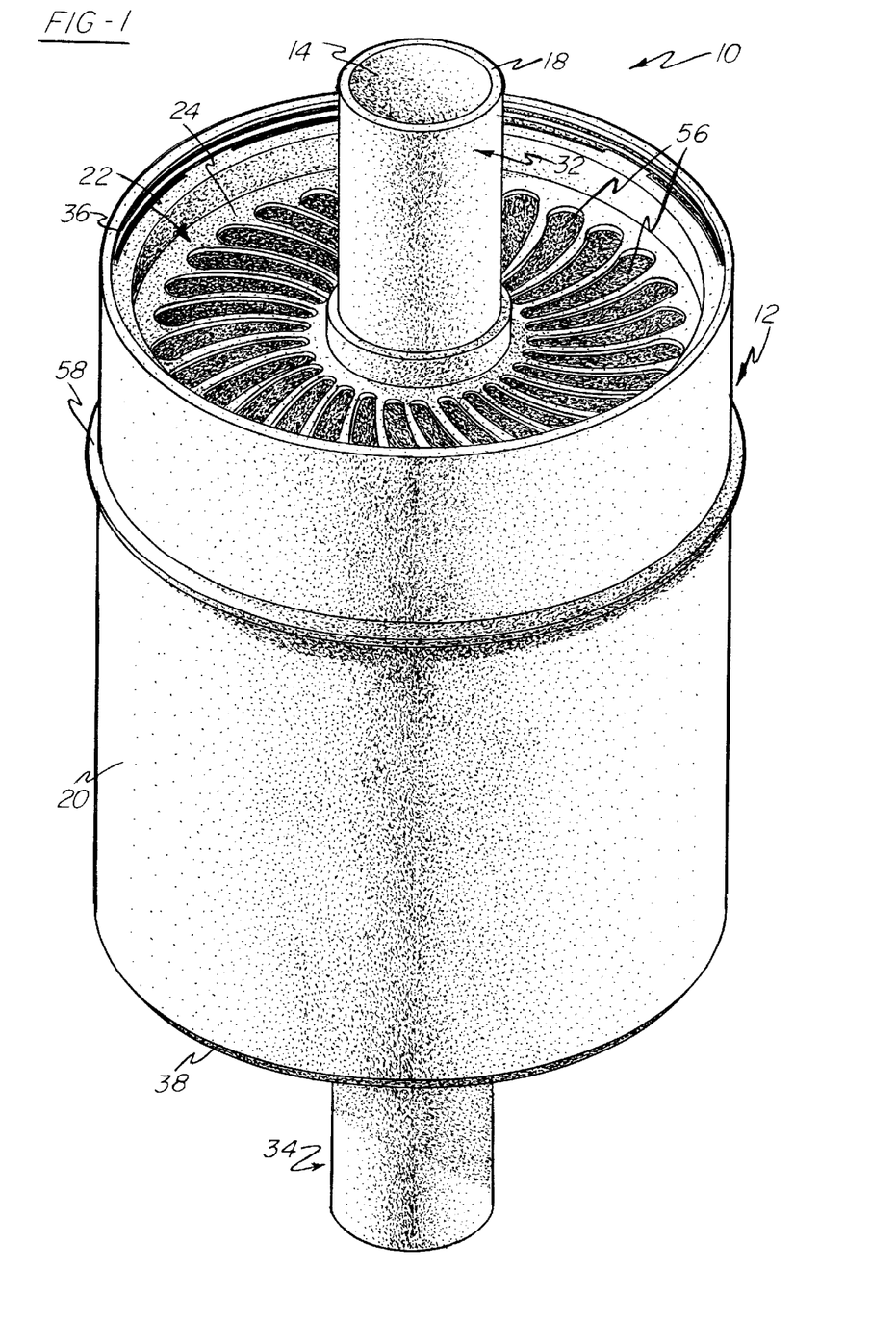
FIG. 1 is a front perspective view of one embodiment of the desiccant cartridge of the present invention.
Figure 2:
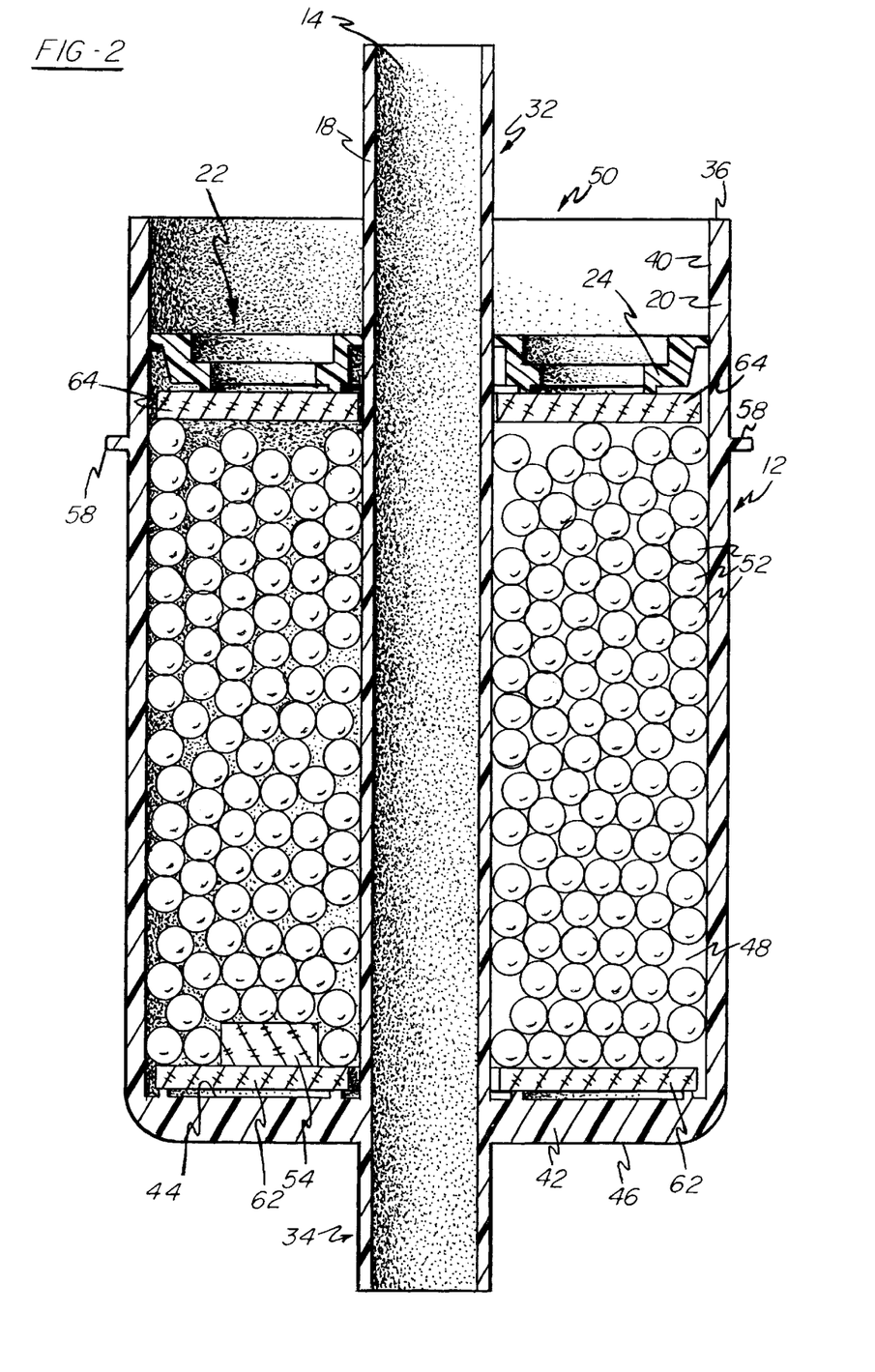
FIG. 2 is a cross-sectional view of the desiccant cartridge of FIG. 1.

As best shown in FIGS. 1 and 2, the desiccant cartridge 10 includes a generally cylindrical cup 12 having spaced inner and outer walls 18 and 20 coaxially disposed and a cap 22. The inner wall 18 of the cup 12 defines an elongated center tube 14 having first and second ends 32 and 34 and the outer wall 20 comprises an upper and lower edge 36 and 38 and has an inner surface 40. The desiccant cartridge 10 further has a transverse portion 42 with a top and bottom surface 44 and 46 and which cooperates with the inner and outer wall 18, 20 to define a chamber 48 having an opening 50 such that the bottom surface 46 faces away from the chamber 48. Accordingly, the cap 22 conforms to the shape of the cup 12 and has a planar portion 24 with a centrally located aperture 30 (FIG. 5) for receiving the inner wall 18 when the cap 22 is received in the chamber 48.

FIGS. 1 and 2 further show that the cup 12 is a one-piece plastic molding, preferably formed from polypropylene, by conventional molding techniques wherein the first end 32 of the elongated center tube 14 extends above the upper edge 36 of the outer wall 20 and the second end 34 of the elongated center tube 14 extends away from the bottom surface 46 of the transverse portion 42.

Figure 3:
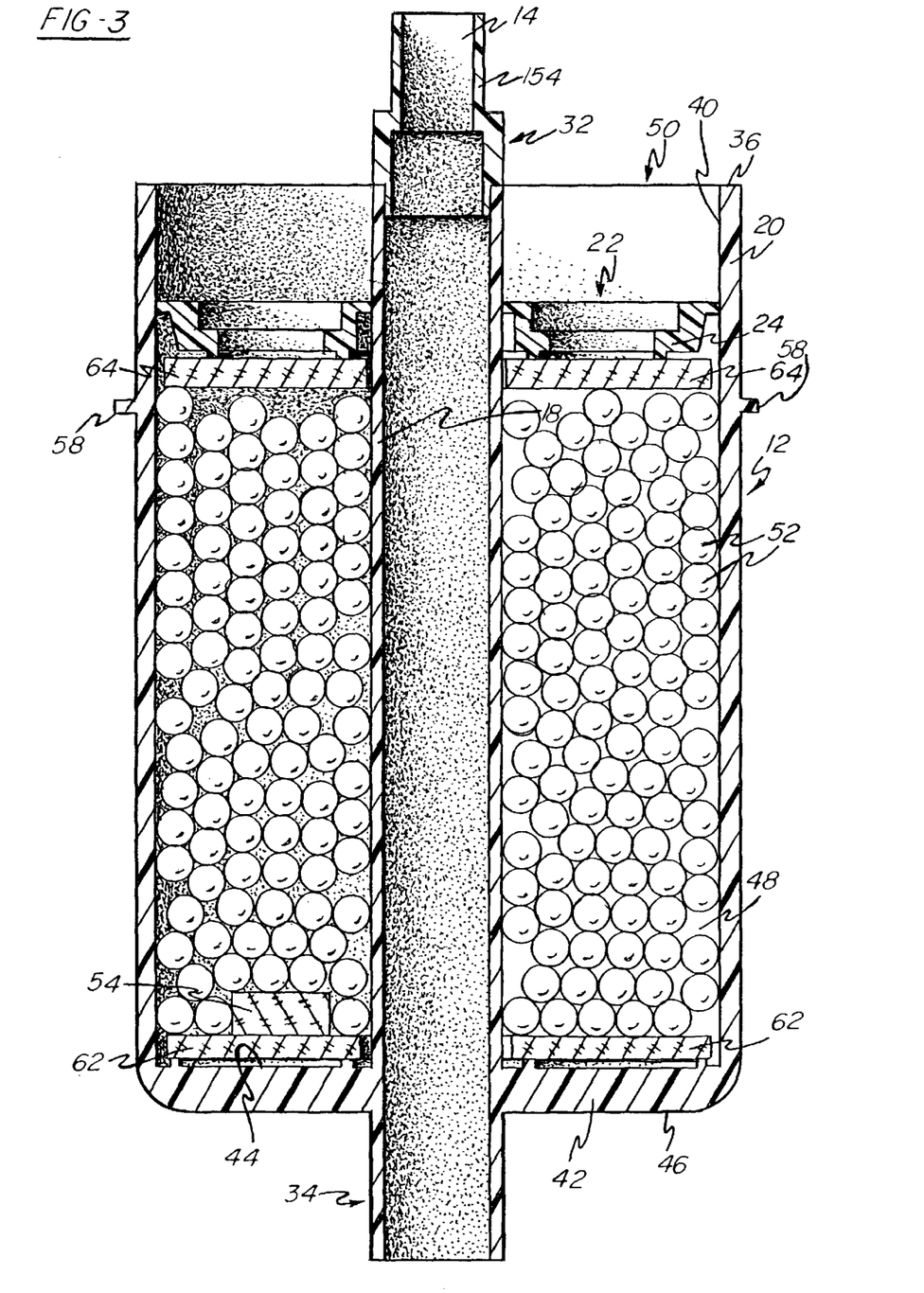
FIG. 3 is a cross-sectional view of another embodiment of the desiccant cartridge of the present invention taken along the same plane shown in FIG. 2.

In another embodiment, as shown in FIG. 3, the first end 32 is comprised of a high temperature plastic 154, preferably formed from a polypropylene/nylon blend to offer greater heat protection than the polypropylene material. In this embodiment, the first end 32 is molded separately from the cup 12 using conventional molding techniques so that the first end 32 will mate with the inner wall 18. After the first end 32 is molded, it is press fit onto the inner wall 18 opposite the second end 34 to form a continuous elongated center tube 14 having a first end 32 made of a high temperature plastic.

FIGS. 2 and 3 further shows a plurality of desiccant particles 52 for dehydrating air and refrigerants (not shown) situated within the chamber 48 along with an optional dye wafer 54 which is helpful for detecting leaks in an a/c system (not shown). The cap 22, which slidably receives the tube 14 through its aperture 30, is securely received within the opening 50 of the chamber 48 to keep the desiccant particles 52 and dye wafer 54 contained therein. Notably, the inner surface 40 of the outer wall 20 of the cup 12 may include a plurality of inner surface protrusions including, but not limited to, ribs, nibs, beads, bumps or other equivalent protrusions (not shown) projecting radially inwardly from the outer wall 20 which engage and retain the cap 22 in one of a number of axially spaced positions.

Figure 5:
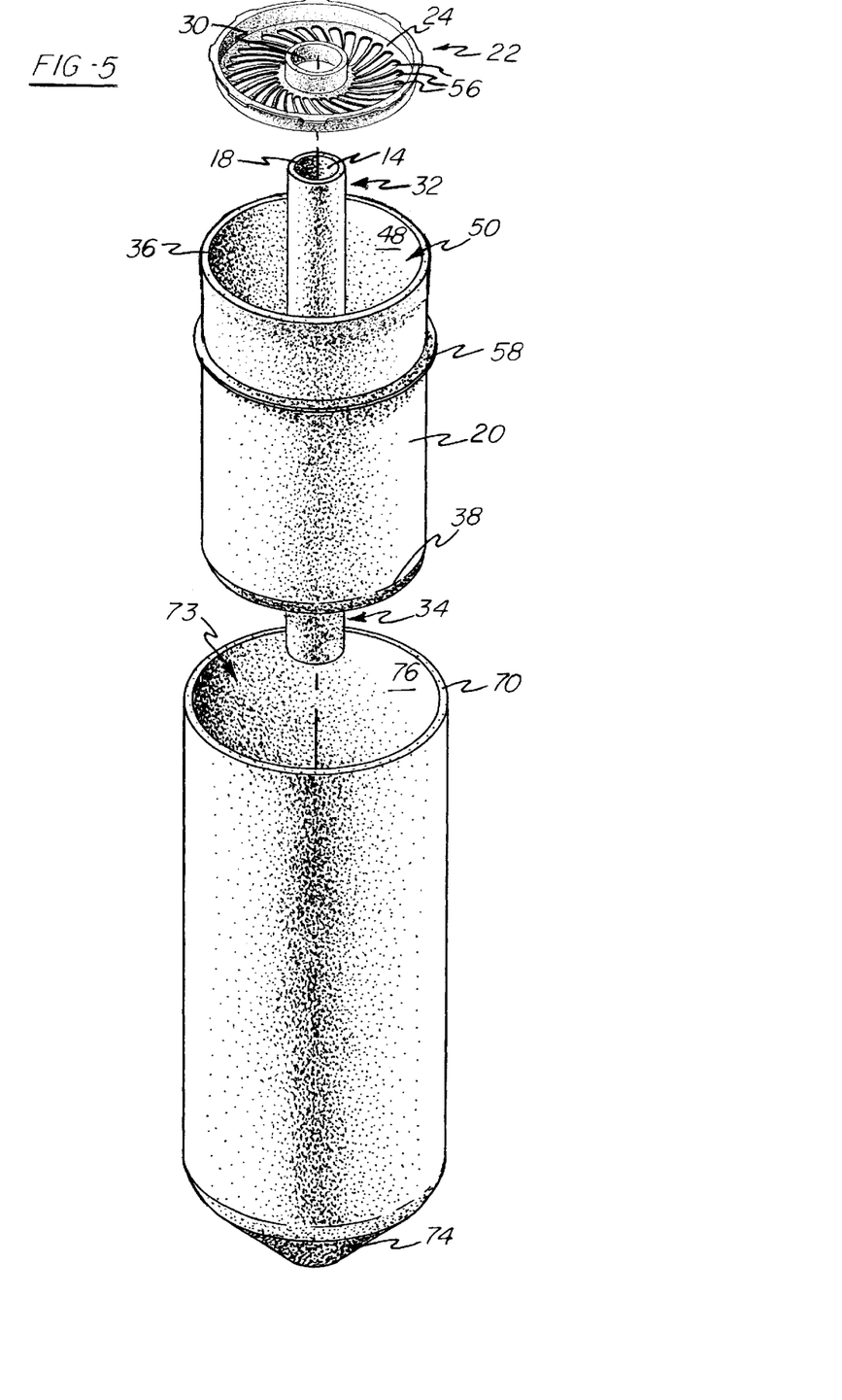
FIG. 5 is a front perspective exploded view assembly of the desiccant cartridge shown in FIG. 1 and the canister in FIG. 4 without the top wall.

Further, in FIGS. 1 and 5, the planar portion 24 of the cap 22 is perforated with a number of generally kidney shaped ports 56 so that the planar portion 24 is permeable to the refrigerant fluid (not shown) to be dried. Although not shown, like the cap 22, the transverse portion 42 of the cup 12 similarly has ports therein. The precise arrangement and shapes of the ports 56 is not critical to the operation of the desiccant cartridge 10 as long as the desiccant 52 remains contained within the cartridge and the refrigerant fluid (not shown) is allowed to enter the cartridge 10, interact evenly with the desiccant 52, exit from the cartridge 10, and then flow through the elongated center tube 14.

Figure 4:
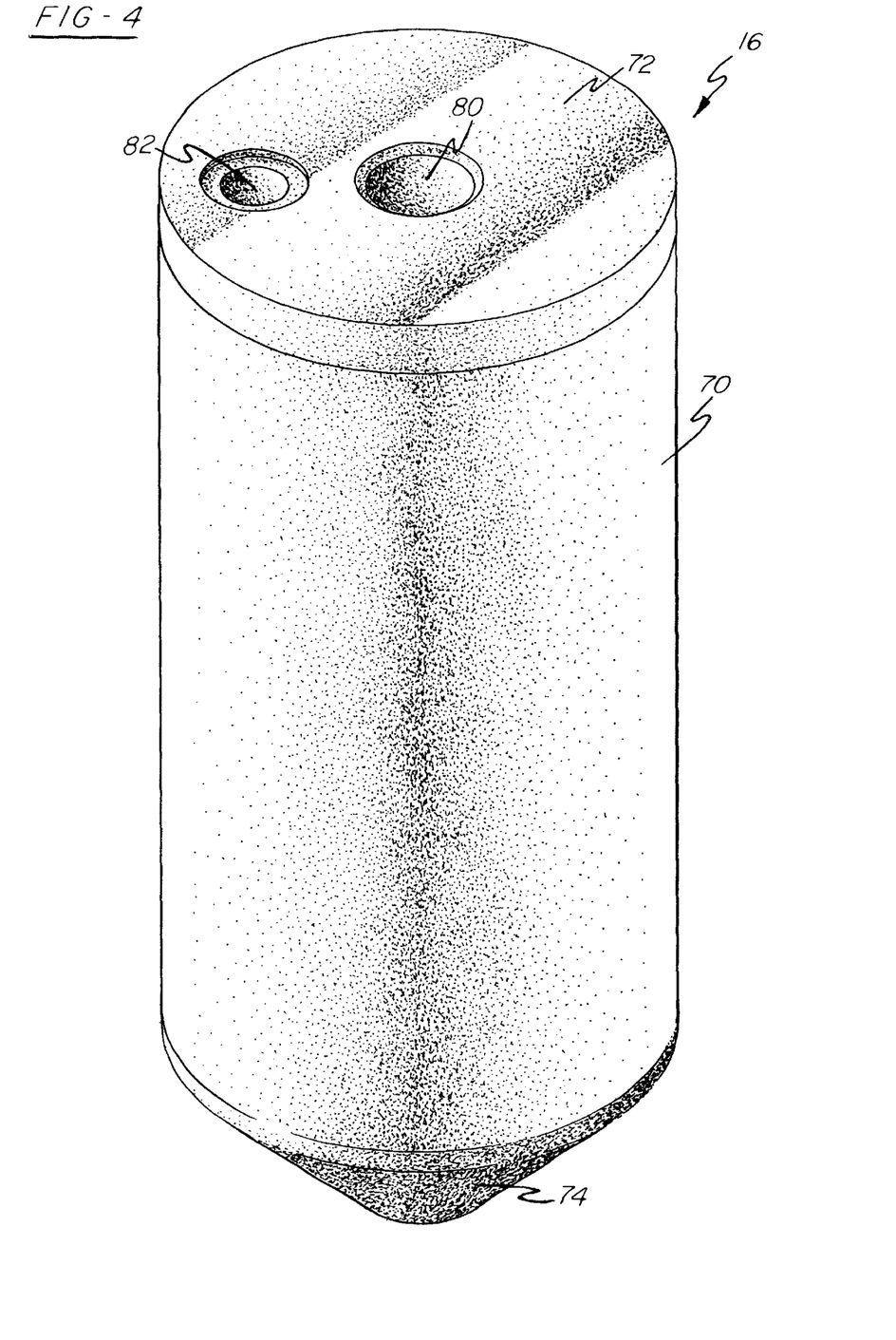
FIG. 4 is a front perspective view of an R/D or accumulator canister of the present invention.

FIG. 1 also shows that the outer wall 20 can include at least one outwardly flared continuous lip portion 58. The flared lip portion 58 is adapted to resiliently fit, by a friction or interference fit, within an R/D or accumulator canister 16 (FIG. 4) of an air conditioning or refrigeration system (not shown). The lip portion 58 serves as a continuous annular seal to prevent air or fluid escape that may otherwise occur along the interface between the circumference of the cup 12 and the canister 16 (FIG. 4). Although the lip 58 is shown spaced below the top 60 of the cup 12, it can be located anywhere along the axial length dimension of the cup 12.

As shown in FIGS. 2 and 3, a permeable lining material 62 and 64, such as a two-ply fiberglass, can be placed inside the chamber 48 near the transverse portion 42 and the cap 22 to trap the desiccant 52 in the cartridge 10. The plies 62, 64 must be permeable to the air or fluid (not shown) to be dried but impermeable to the particulate desiccant 52. Although the use of a two-ply fiberglass is preferred, the artisan can appreciate that other materials such as gauze or felt may be substituted.

Accordingly, when the desiccant cartridge 10 is charged with the desiccant 52, the permeable lining material 62 can be inserted by sliding it down the inner wall 18 until positioned adjacent the transverse portion 42. The dye wafer 54 is first placed into the chamber 48, and next the required amount of desiccant 52 is poured therein. Once the desiccant 52 is charged, the permeable lining material 64 can be slid down the inner wall 18 against the desiccant 52 and the cap 22 secured to the cup 12.

Once the desiccant cartridge 10 is assembled, it can then be inserted into the chamber 76 (FIG. 5) of an R/D or accumulator canister 16 (FIG. 4). The cup 12 (FIG. 4) may be vibrator or bowl fed to a robotic arm (not shown) for automatic installation into the canister 16 (FIG. 4).

Figure 6:
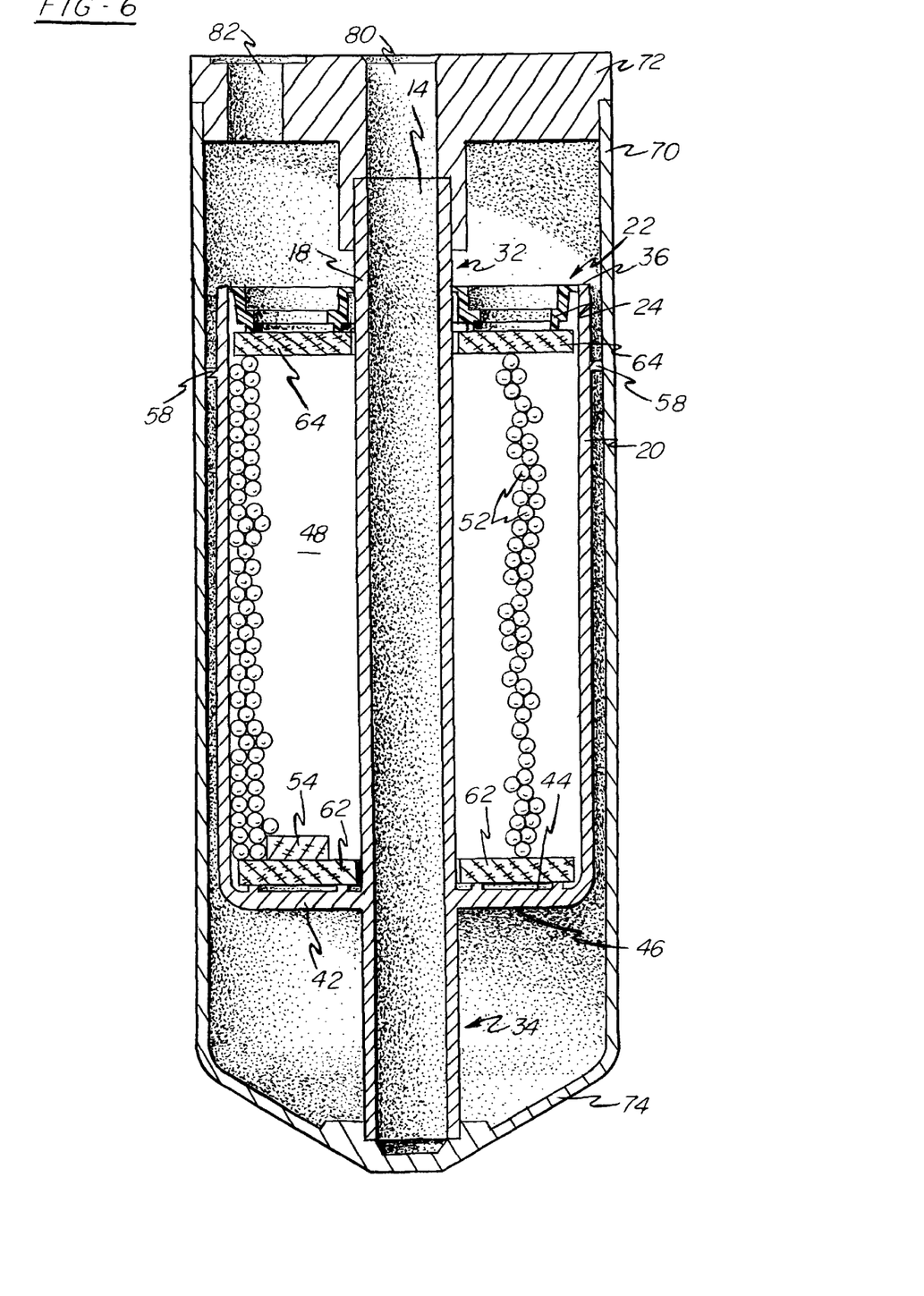
FIG. 6 is a cross-sectional view of the desiccant cartridge of FIG. 1 installed in the canister of FIG. 4.

As best shown in FIGS. 4 and 6, an R/D or accumulator canister 16 typically includes an outer wall 70 axially disposed and a bottom wall 72 cooperating with the outer wall 70 to define a chamber 76 having an opening 73. The bottom wall 74 is preferably v-shaped. The canister 16 further is provided with a top wall 72 having an outlet port 80, preferably centrally located, and one of the walls 70, 72, 74, shown here as the top wall 72, further comprises an inlet port 82. During assembly the top wall 72 is secured, preferably by welding, to the canister 16 opposite the bottom wall 74 to seal the chamber 76. In this embodiment, note that the first end of the center tube is contiguous with the extension of port 80.

Figure 7:
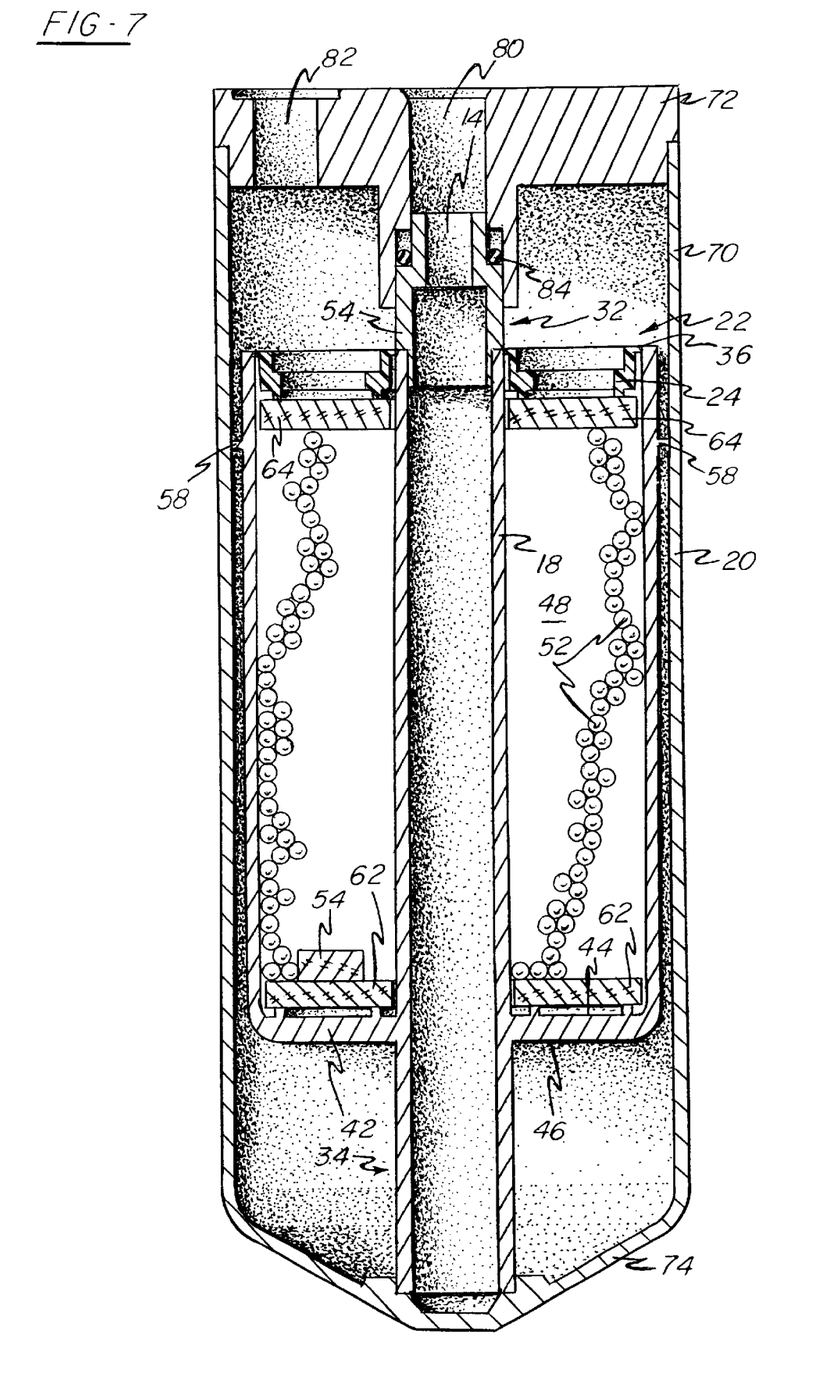
FIG. 7 is a cross-sectional view of the desiccant cartridge represented by FIG. 3 installed in the canister of FIG. 4 and further illustrating a high temperature o-ring.

Prior to placing the top wall 72 onto the canister 16 to complete assembly of the R/D or accumulator 68, as best shown in FIGS. 6 and 7, an assembled desiccant cartridge 10 is placed within the chamber 76 of the canister 16 so that the second end 34 of the tube 14 is spaced above the bottom wall 74 by the use of a pedestal-like mounting structure.

Additionally, as shown in FIG. 7, an insulating o-ring 84 may be placed around the first end 32 of the center tube 14 to offer further protection from heat encountered from welding the top wall 72 of the canister 16 thereon. The high temperature o-ring 84 preferably is made from a high temperature HNBR rubber material available from Parker.

As can be seen in FIGS. 6 and 7, when the top wall 72 is placed and welded onto the canister 16, the center tube 14 aligns with the outlet port 80 such that the first end 32 of the tube 14 is in communication therewith to allow for removal of air or fluid (not shown) flowing into the canister 16 from the inlet port 82 during operation.

Figure 9:
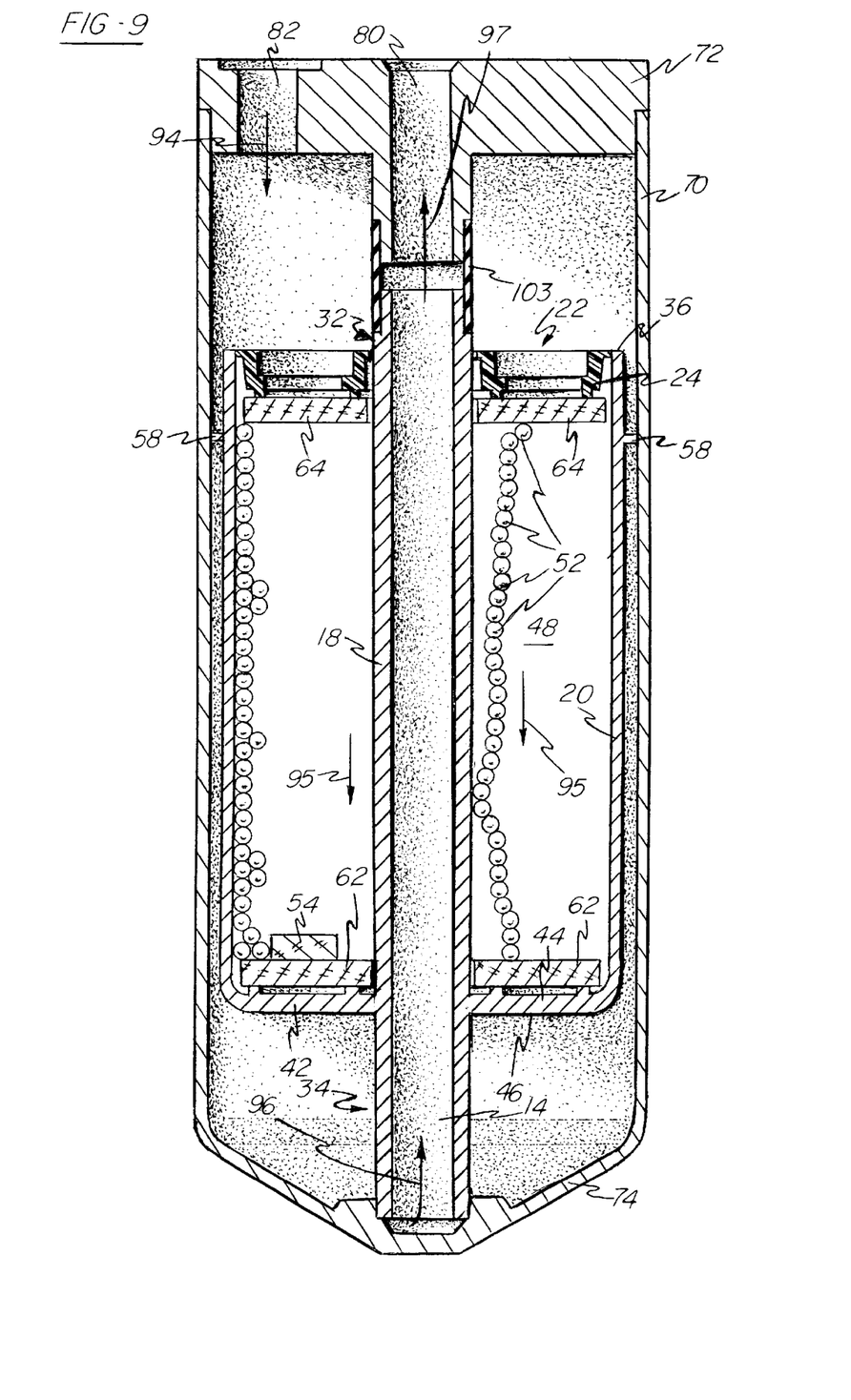
FIG. 9 is a cross-sectional view of another embodiment.

Further, with respect to the center tube 14 as shown in FIG. 9, and more specifically, the first end 32 of the tube, it can be advantageous to use a plastic collar 103 having certain heat shrinkage properties so that after welding of the R/D or accumulator lid to the housing, the tube cools and shrinks to form a better seal with the outlet port 80. In the embodiment shown in FIG. 9, the heat shrinkable collar fits around the outer diameter of the extension 80 and the upper end 32 of the center tube covering the air space between the extension and the tube. Upon heating or in the welding process for the can assembly, the collar will shrink back to its elastic limit. Accordingly, the artisan will appreciate that the center tube 14 may comprise varying lengths such that the first end 32 does not communicate with the outlet port 80.

Figure 8:
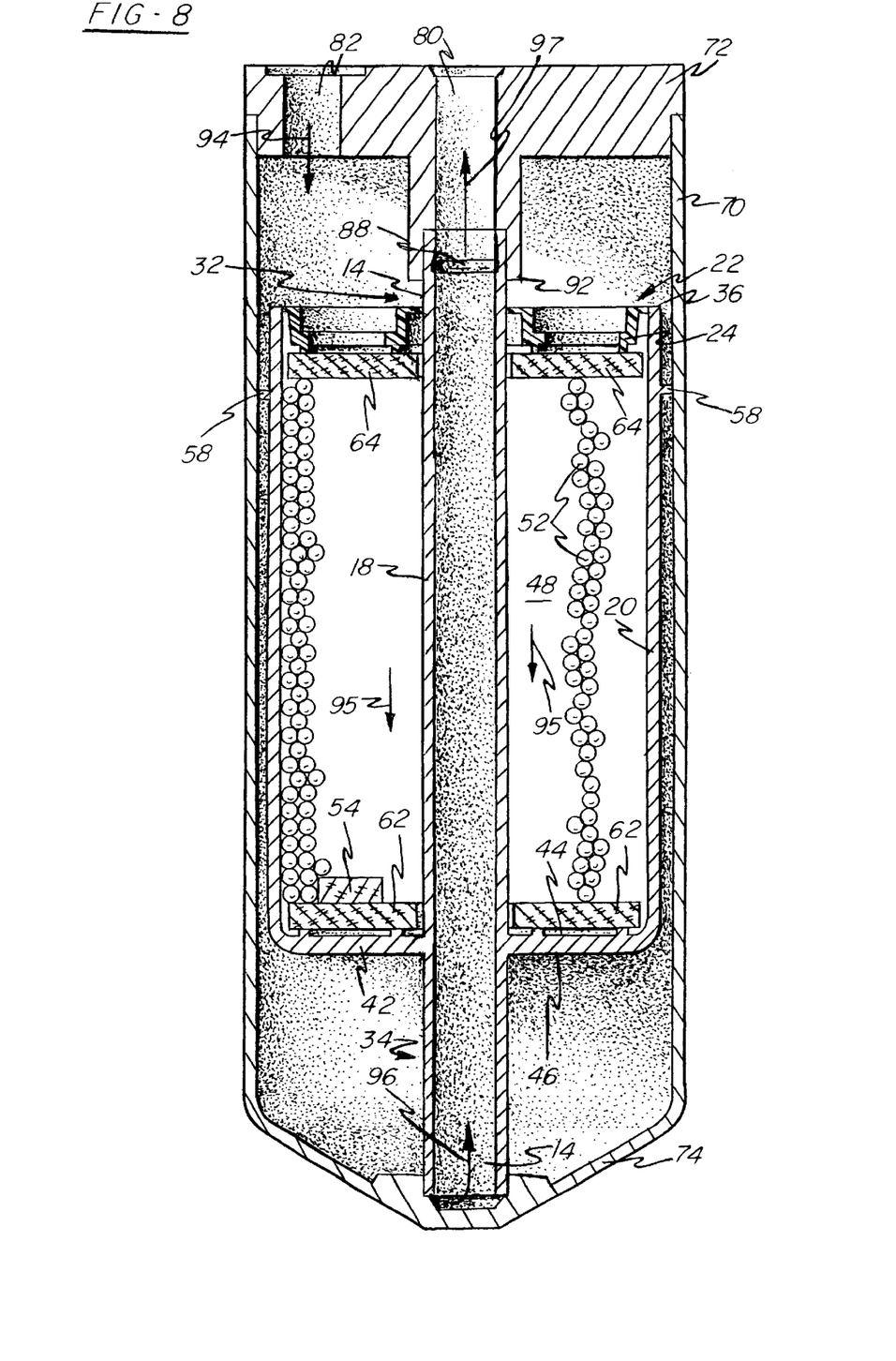
FIG. 8 is a cross-sectional view of another embodiment of the desiccant cartridge of the present invention installed in the canister of FIG. 4 and illustrating a tubular insert.

In the embodiment shown in FIG. 8, a resilient tubular insert 88, or ferrule, larger in diameter than the center tube 14 is inserted through the outlet port 80, so that the ferrule fits snugly into the inner diameter of the first end 32 of the tube 14 forcing the tube radially outwardly to form a seal with the head portion 92 of the outlet port from the R/D or accumulator. The tubular insert 88 may be formed from a high temperature plastic, such as a polypropylene/nylon blend or high temperature elastomer.

As best shown in FIG. 8, during operation of the a/c system (not shown), air or refrigerant (not shown) enters the canister 16 through the inlet port 82 as indicated by arrow 94. The refrigerant fluid flows through the ports 56 in the cap 22 and into the chamber 48 containing the desiccant 52 as indicated by arrow 95. Moisture is removed from the refrigerant fluid by the desiccant 52 while solid particles (not shown) are filtered by the plies 62, 64. The treated refrigerant then exits the cup 12 through the ports (not shown) in the transverse portion 42, enters the second end 34 of the center tube 14, as indicated by arrow 96, and finally exits the canister 16 via the outlet port 80, as indicated by arrow 97 in FIG. 8. As may be appreciated, fluid flow is not permitted around the cup 12 due to the seal formed between the flared lip portion 58 and the canister 16.

Accordingly, the elongated center tube of the desiccant cartridge effectively eliminates the need for fluid flow tubes in R/Ds and accumulators. As such, the center tube design of the desiccant cartridge provides a simple way for replacing a metal fluid flow tube while at the same time reducing the material, manufacturing, handling and assembly costs associated therewith. Also, the plastic center tube of the desiccant cartridge further eliminates the metal chips and debris associated with metal tubes which can harm air conditioning systems.

While the forms of apparatus herein described constitute preferred embodiments of the invention, it is to be understood that the invention is not limited to these precise forms of apparatus, and that changes may be made therein without departing from the scope of the invention.

What is claimed is:

1. A desiccant cartridge used in combination with an R/D or accumulator canister comprising:

a desiccant cartridge comprising a cup having spaced inner and outer walls said outer wall comprising an upper and lower edge, said cup further comprising a transverse portion having a top and bottom surface, said transverse portion cooperating with said inner and outer wall to define a chamber having an opening such that said bottom surface faces away from said chamber, said inner wall further defining an elongated tube having opposing first and second ends, said second end extending away from said bottom surface of said transverse portion, a plurality of desiccant particles contained within said chamber, a cap comprising a planar portion having an inner circumference defining an aperture for slidably receiving said tube, said cap being securely received within said opening to contain said particles within said chamber;

an R/D or accumulator canister including an outer wall and opposing top and bottom walls connected to said outer wall to define a chamber, said top wall having a port therein;

a tubular insert having first and second ends; and wherein said cartridge is securely retained within said chamber of said R/D or accumulator canister, said first end of said tube being aligned with said outlet port, and said first end of said tubular insert fitting inside and sealingly engaging said first end of said tube and said second end of said insert sealingly engaging said outlet port thereby allowing said elongated tube to communicate with said port, said tubular insert being composed of a high temperature resistant polymer.

2. The desiccant cartridge used in combination with an R/D or accumulator canister as recited in claim 1 wherein said high temperature resistant polymer comprises a polypropylene/nylon blend.

3. The desiccant cartridge used in combination with an R/D or accumulator canister as recited in claim 1 wherein said high temperature resistant polymer comprises a heat insulating elastomer.

4. The desiccant cartridge used in combination with an R/D or accumulator canister as recited in claim 3 wherein said heat insulating elastomer comprises HNBR rubber.

5. The desiccant cartridge used in combination with an R/D or accumulator canister as recited in claim 1 wherein said tubular insert comprises a shrinkable plastic collar connecting said port and said first end of said elongated tube.

6. A desiccant cartridge used in combination with a R/D or accumulator canister comprising:

a desiccant cartridge comprising a cup having spaced inner and outer walls, said outer wall comprising an upper and lower edge, said cup further comprising a transverse portion having a top and bottom surface, said transverse portion cooperating with said inner and outer walls to define a chamber having an opening such that said bottom surface faces away from said chamber, said inner wall further defining an elongated tube having opposing first and second ends, said first end extending above said transverse portion, a plurality of desiccant particles contained within said chamber, a cap comprising a planar portion having an inner circumference defining an aperture for slidably receiving said tube, said cap being securely received within said opening to contain said particles within said chamber;

a R/D or accumulator canister including an outer wall and opposing top and bottom walls connected to said outer wall to define a chamber, said top wall having a port therein; and wherein said cartridge is securely retained within said chamber of said R/D or accumulator canister such as that said first end of said tube is in communication with said outlet port and said second end is in communication with said bottom wall of said receiver dryer;

said first end of said elongated tube being received within said port, and a ferrule force fit within said first end of said elongated tube to urge said first end into sealing contact with said port.

7. A desiccant cup comprising:

spaced inner and outer walls, said outer wall comprising an upper and lower edge, said inner wall further defining an elongated tube having opposing first and second ends; and a transverse portion having a top and bottom surface, said transverse portion further cooperating with said inner and outer walls to define a chamber having an opening such that said bottom surface faces away from said chamber, said first end of said elongated tube extending above said upper edge of said outer wall and said second end of said elongated center tube extending away from said bottom surface of said transverse portion wherein said first end comprises a high temperature resistant plastic, said high temperature resistant plastic being a polypropylene/nylon blend.

8. A desiccant cartridge used in combination with an R/D or accumulator canister comprising:

a desiccant cartridge comprising a cup having spaced inner and outer walls, said outer wall comprising an upper and lower edge, said cup further comprising a transverse portion having a top and bottom surface, said transverse portion cooperating with said inner and outer walls to define a chamber having an opening such that said bottom surface faces away from said chamber, said inner wall further defining an elongated tube having opposing first and second ends, said first end extending above said upper edge of said outer wall and said second end extending away from said bottom surface of said transverse portion, a plurality of desiccant particles contained within said chamber, a cap comprising a planar portion having an inner circumference defining an aperture for slidably receiving said tube, said cap being securely received within said opening to contain said particles within said chamber;

an R/D or accumulator canister including an outer wall and opposing top and bottom walls connected to said outer wall to define a chamber, said top wall having an outlet port therein; and wherein said cartridge is securely retained within said chamber of said R/D or accumulator canister such that said first end of said tube is in communication with said outlet port and said second end is in communication with said bottom wall of said receiver dryer, said first end comprising a high temperature resistant plastic, said high temperature resistant plastic being a polypropylene/nylon blend.

9. A desiccant cartridge used in combination with an R/D or accumulator canister comprising:

a desiccant cartridge comprising a cup having spaced inner and outer walls said outer wall comprising an upper and lower edge, said cup further comprising a transverse portion having a top and bottom surface, said transverse portion cooperating with said inner and outer wall to define a chamber having an opening such that said bottom surface faces away from said chamber, said inner wall further defining an elongated tube having opposing first and second ends, said second end extending away from said bottom surface of said transverse portion, a plurality of desiccant particles contained within said chamber, a cap comprising a planar portion having an inner circumference defining an aperture for slidably receiving said tube, said cap being securely received within said opening to contain said particles within said chamber;

an R/D or accumulator canister including an outer wall and opposing top and bottom walls connected to said outer wall to define a chamber, said top wall having an outlet port therein;

a tubular insert having first and second ends; and wherein said cartridge is securely retained within said chamber of said R/D or accumulator canister, said first end of said tube being aligned with said outlet port, and said first end of said tubular insert fitting inside and sealingly engaging said first end of said tube and said second end of said insert sealingly engaging said outlet port thereby allowing said elongated tube to communicate with said outlet port, said tubular insert comprising a high temperature resistant plastic, said high temperature resistant plastic being a polypropylene/nylon blend.

10. A desiccant cup comprising:

spaced inner and outer walls, said outer wall comprising an upper and lower edge, said inner wall further defining an elongated tube having opposing first and second ends, said first end comprising a high temperature resistant plastic;

an insulating o-ring encircling said first end of said tube; and a transverse portion having a top and bottom surface, said transverse portion further cooperating with said inner and outer walls to define a chamber having an opening such that said bottom surface faces away from said chamber, said first end of said elongated tube extending above said upper edge of said outer wall and said second end of said elongated center tube extending away from said bottom surface of said transverse portion, said high temperature plastic comprising a polypropylene/nylon blend.

11. A desiccant cartridge used in combination with a R/D or accumulator canister comprising:

a desiccant cartridge comprising a cup having spaced inner and outer walls, said outer wall comprising an upper and lower edge, said cup further comprising a transverse portion having a top and bottom surface, said transverse portion cooperating with said inner and outer walls to define a chamber having an opening such that said bottom surface faces away from said chamber, said inner wall further defining an elongated tube having opposing first and second ends, said first end comprising a high temperature resistant plastic and extending above said transverse portion, an insulating o-ring encircling said first end of said tube, a plurality of desiccant particles contained within said chamber, a cap comprising a planar portion having an inner circumference defining an aperture for slidably receiving said tube, said cap being securely received within said opening to contain said particles within said chamber;

a R/D or accumulator canister including an outer wall and opposing top and bottom walls connected to said outer wall to define a chamber, said top wall having an outlet port therein; and wherein said cartridge is securely retained within said chamber of said R/D or accumulator canister such that said first end of said tube is in communication with said outlet port and said second end is in communication with said bottom wall of said receiver dryer, said high temperature resistant plastic comprising a polypropylene/nylon blend.

12. The combination as recited in claim 6 wherein said ferrule comprises a high temperature resistant polymer material.

13. The combination as recited in claim 12 wherein said high temperature resistant polymer material comprises a polypropylene/nylon blend.

14. The combination as recited in claim 12 wherein said high temperature resistant polymer material comprises a high temperature resistant elastomer.

15. A desiccant cartridge used in combination with a R/D or accumulator canister comprising:

a desiccant cartridge comprising a cup having spaced inner and outer walls, said outer wall comprising an upper and lower edge, said cup further comprising a transverse portion having a top and bottom surface, said transverse portion cooperating with said inner and outer walls to define a chamber having an opening such that said bottom surface faces away from said chamber, said inner wall further defining an elongated tube having opposing first and second ends, said first end extending above said transverse portion, a plurality of desiccant particles contained within said chamber, a cap comprising a planar portion having an inner circumference defining an aperture for slidably receiving said tube, said cap being securely received within said opening to contain said particles within said chamber;

a R/D or accumulator canister including an outer wall and opposing top and bottom walls connected to said outer wall to define a chamber, said top wall having a port therein; and wherein said cartridge is securely retained within said chamber of said R/D or accumulator canister such that said first end of said tube is in communication with said port and said second end is in communication with said bottom wall of said receiver dryer, and a heat shrinkable collar surrounding said first end of said tube and said port.

* * * * *